Jan. 25, 1944. C. O. BRUESTLE 2,339,761
CABLE PULL-OFF MECHANISM
Filed Nov. 3, 1942 3 Sheets-Sheet 1

INVENTOR.
CARL O. BRUESTLE
BY
ATTORNEYS

Jan. 25, 1944.  C. O. BRUESTLE  2,339,761
CABLE PULL-OFF MECHANISM
Filed Nov. 3, 1942  3 Sheets-Sheet 2
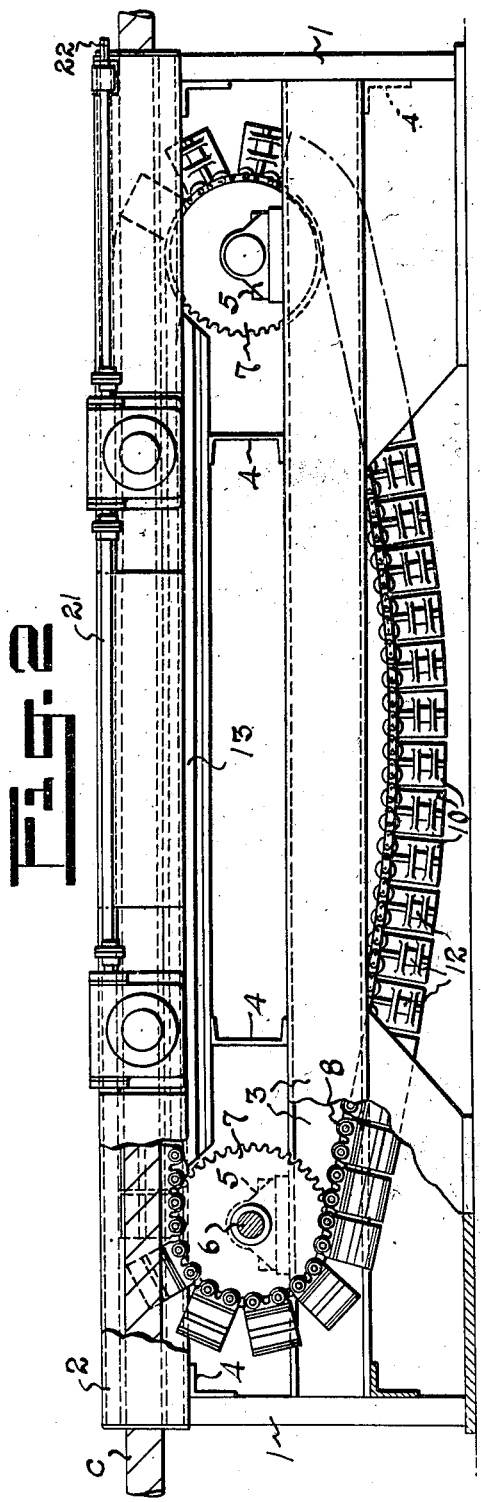
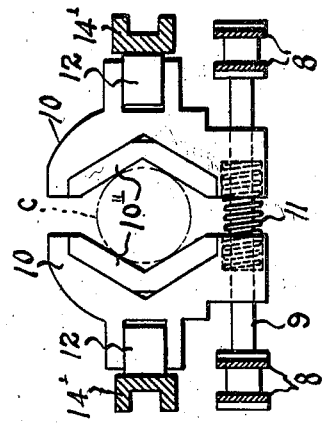
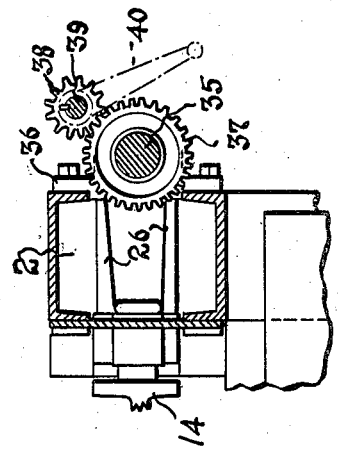
INVENTOR.
CARL O. BRUESTLE
BY Darby & Darby
ATTORNEYS Jan. 25, 1944.   C. O. BRUESTLE   2,339,761
CABLE PULL-OFF MECHANISM
Filed Nov. 3, 1942   3 Sheets-Sheet 3
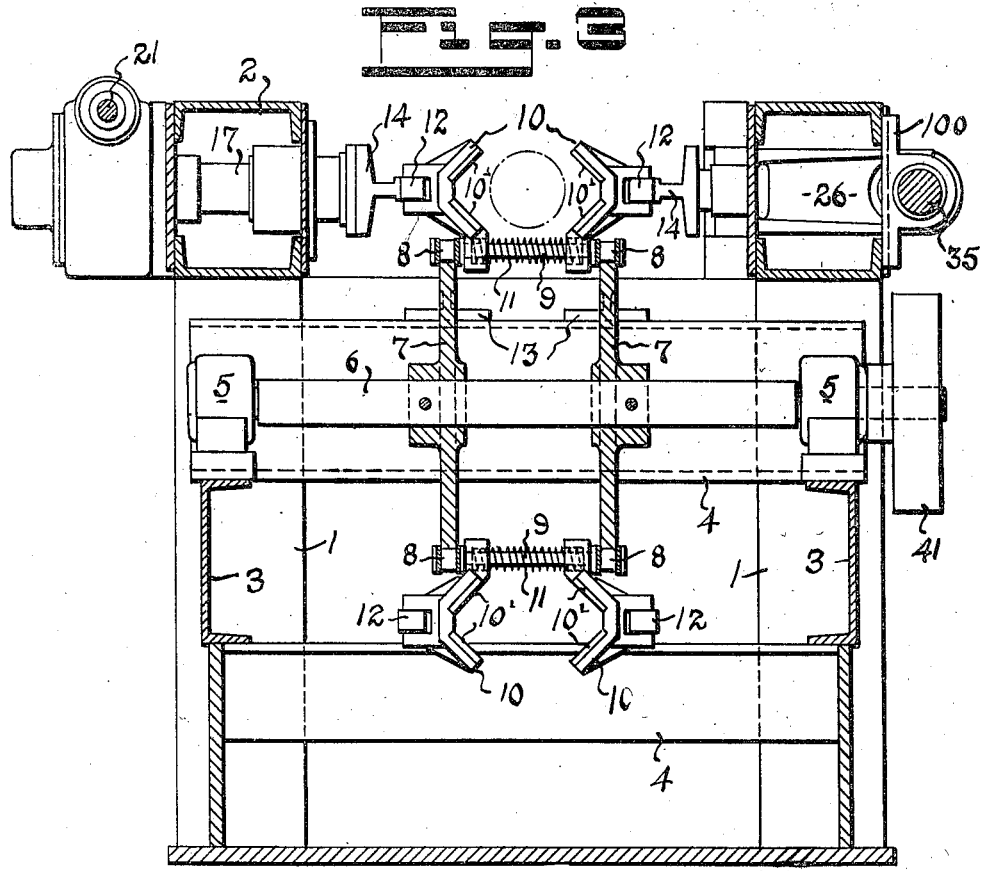
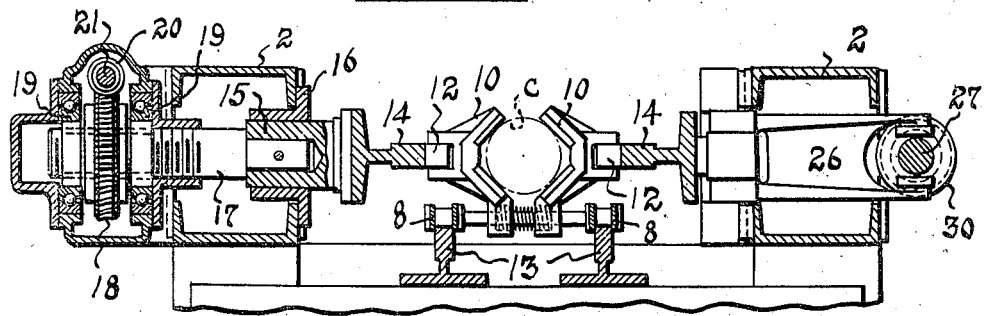
INVENTOR.
CARL O. BRUESTLE
BY Darby & Darby
ATTORNEYS Patented Jan. 25, 1944

2,339,761

UNITED STATES PATENT OFFICE 2,339,761

CABLE PULL-OFF MECHANISM

Carl O. Bruestle, Rahway, N. J., assignor to Syncro Machine Company, Rahway, N. J., a corporation of New Jersey Application November 3, 1942, Serial No. 464,409

15 Claims. (Cl. 28—71.5)

This invention relates to means of the caterpillar type for pulling cable and similar elongated flexible bodies through and from machines in which they are being processed.

Particularly in the case of the manufacture of built-up electric cables of larger sizes, difficulty has been encountered in the construction of mechanism suitable for the purpose of exerting sufficient lengthwise pull on the cable as it is fed through machines for applying helical insulating wraps thereto without damage to the cable. Reference is made to the taping operation, although it will be apparent from the following description that this structure is useful in pulling cable during the various processing steps, and in some cases may not be limited to use with cable, but might be employed for pulling large rope, tubing and the like.

An important object of this invention is the provision of an easily adjustable machine of this type which is capable of use in the processing of large cables of different sizes within the range of the machine.

Another object of this invention is to provide a cable handling machine so constructed as not to cause bending and return bending of the cable with subsequent shifting of the insulating strips as is the case in the frequently used circular drum type of pull-off capstan.

A still further object of the invention is to provide a machine of this type which will readily adapt itself to the normal irregularities or variations in the diameter of large cables as a result of manufacturing variations, splices and the like.

Another object of this invention is to provide a machine of this type constructed and arranged so that there is little danger of getting the cable dirty and greasy in the machine itself, as is liable to happen in some forms of machines of this type heretofore employed. In this connection it may be noted that particularly in the case of paper insulated cables it is undesirable to get grease and oil on the paper insulation. Some machines heretofore used have introduced the difficulty of themselves dropping oil and grease on the cable during its transport therethrough. This difficulty is eliminated by this machine.

Another advantage of the machine of this invention is present in the speed with which the machine may be adjusted very quickly to adapt it to the handling of a wide range of cable sizes, as well as for adjusting the pressure of the gripping devices on the cable.

Another advantage of the structure herein disclosed is found in the fact that the nature and manner of gripping the cable makes it practically impossible for the machine to slip on the cable and thereby damage it.

Other and more detailed objects of the invention will be apparent from the following description of the embodiment herein disclosed.

The subject matter of this invention is related in some respects to another machine having similar objects disclosed in my copending application Serial No. 464,410 filed November 13, 1942 and entitled "Cable pull off mechanism."

This invention resides substantially in the combination, construction, arrangement and relative location of parts, all as will be described in detail below.

Referring to the drawings,

Figure 2 is a side elevational view of the mechanism of Figure 1 with a portion of the left hand end cut away;

Figure 3 is a cross-sectional view taken on the line 3—3 of Figure 1;

Figure 4 is a cross-sectional view taken on the line 4—4 of Figure 1;

Figure 5 is a cross-sectional view taken on the line 5—5 of Figure 1; and

Figure 6 is an enlarged detail view of the gripping devices showing how a similar cable is gripped and showing a slightly modified form of gripping jaws.

Figure 1:
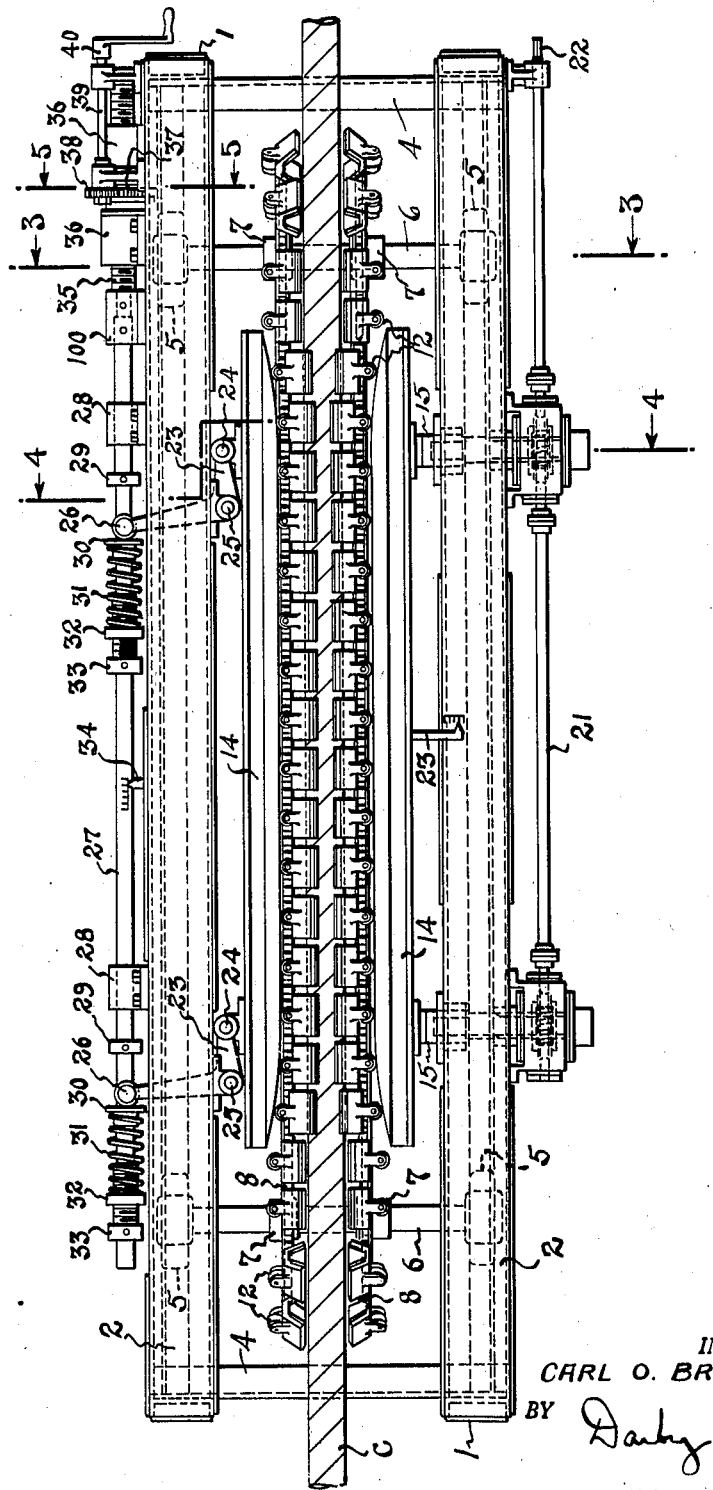
Figure 1 is a top plan view of the embodiment selected for the purpose of disclosing herein the subject matter of my invention.

As illustrated the machine consists of a framework of suitable configuration comprising end supports 1 connected by lower longitudinal beams 3, upper box-like beam housings 2 and suitable cross-braces 4 all united together in any suitable manner to make a rigid, strong framework. Supported on the longitudinal beams 3 near each end of the machine are a pair of bearings 5 in which are journaled the transverse shafts 6. As shown in Figure 3, one of the shafts 6 is provided with a drive pulley 41 by means of which the power for operating the machine may be applied thereto. Keyed to each of the shafts between the bearings 5 are the spaced sprocket wheels 7 around which extend a pair of endless chains 8 which are connected at suitable intervals by cross connecting pins or rods 9, all as clearly shown in Figure 3.

Slidably supported on adjacent pairs of rods 9 are a pair of V-shaped jaws 10, each of which pair comprises a gripping device. A plurality of these gripping devices are provided throughout the chain lengths as shown. Each pair comprises opposed jaws, as is clear from the figures. The inner faces of the jaws are inclined at a suitable angle, as for example at 120 degrees, and are covered with renewable gripping plates 10' which may be of some suitable resilient material such as rubber of the proper stiffness. The jaw pairs are slidably mounted on the rods 9 and have interposed between them coil springs encircling the rods and arranged to hold the jaws a maximum distance apart when unrestrained, as determined by the lengths of the rods 9. The outer faces of the jaws are provided with hooks in which are journaled small pressure rollers 12 which cooperate with a pair of side rails 14, as shown particularly well in Figures 1 and 3. Extending longitudinally of the machine, just below the upper flight of the endless chain are a pair of supporting rails 13 best seen in Figure 4, positioned and shaped to cooperate with the chains 8 so as to aid in carrying the weight thereof as well as of the cable and maintain the upper flight in this region in a straight or horizontal plane.

The rail 14 at the left hand side of the machine as viewed in Figure 4 (i. e. the lower rail in Figure 1) is provided with a pair of arms 15 which may slide longitudinally in sleeves 16 of similar crosssectional shape mounted on the adjacent box-like housing 2. Pinned in the arms 15 are threaded shafts 17 which pass through the internally threaded hub of a worm wheel 18. The threads of the hub of the worm wheel engage the threads on the shaft 17 so as to act as a rotatable nut causing the shafts 17 to move endwise without turning when the nut is revolved. The nut is provided with journaled hubs rotatably mounted in the bearings 19, as clearly shown in Figure 4. A worm 20 cooperates with each worm nut 18 and is mounted upon a shaft 21 which extends to one end of the machine as shown in Figure 2 and is shaped to receive a crank. The shaft 21 causes the operation of both worm nuts 18 so that the side pressure rail 14 may be moved transversely of the machine towards and away from its longitudinal axis while maintaining it parallel to that axis.

The other pressure rail 14, that is the upper rail in Figure 1, is provided with a pair of brackets for pivotally supporting at 24 one end of each of the bell crank levers 23. These levers are pivotally mounted at their elbows at 25 on brackets secured to the adjacent box-like member 2. The other end 26 of each bell crank lever 23 is bifurcated so as to nest with a shaft 27 mounted on the adjacent box-like member 2 for sliding movement in bearings 28. The shaft 27 is provided with a pair of collars 29 secured thereto adjacent the bifurcated arms 26 of the bell crank levers. These arms also engage sleeves 30 slidably mounted on the shaft 27 against each of which one end respectively of each of the springs 31 bear. The other ends of these sleeves bear against threaded collars 32 which are threadedly mounted on sleeves 33 pinned to the shaft 27 as shown. The pressure which the springs 31 exert on the bell crank levers may therefore be adjusted by rotating the collars 32 on their sleeves to cause them to take desired positions along the shaft 27.

The right hand end, Figure 1, of shaft 27 is coupled to a threaded shaft 35 by means of a coupling device 100, shaped to slide along the side face of the box-like member 2 and prevent rotation of shaft 35 while allowing it to slide longitudinally. The threaded shaft 35 passes freely through a pair of bearing members 36 between which is journaled a rotatable nut 37 having a gear on its outer periphery. A shaft 39 rotatably mounted in suitable bearings is provided with a pinion 38 at one end meshing with the external gear on the nut 37 and provided with a crank at its other end. The lower pressure rail 14, Figure 1, is provided with a pointer 23 cooperating with a fixed scale mounted on the lower box-like member 2 and calibrated for different cable sizes to determine the proper position of that side rail. The proper position of the other side rail is determined by means of a pointer 34 secured to the upper box-like member, Figure 1, and cooperating with a suitable calibrated scale mounted on the shaft 27.

In using the machine the first step consists in laying the starting end of the cable in any position. This is accomplished by rotating the crank 40 in a direction to cause the shaft 27 to move to the left until the collars 29 thereon engage the ends 26 of the bell crank levers 23. These levers are then swung counterclockwise by further movement of shaft 27 to the left to withdraw the upper rail or shoe 14 (Figure 1) back away from the path of travel of the cable. In a somewhat similar manner the rotation of crank 21 will cause the withdrawal of the lower shoe or rail 41 so that the gripper jaw pairs on the carrier will be separated a maximum amount. The starting end of the cable may then be laid in between the gripping devices and the rails 14 returned to a position corresponding to the particular size of cable being processed. As the rails return to this position they engage the gripper jaw pairs from opposite sides and slide them towards each other (see Figure 3) compressing the springs 11. These rails may be accurately positioned to cause the gripping devices to engage the cable under the desired pressure dependent upon the resistance it affords to longitudinal movement. The scales and pointers 23 and 34 will facilitate these adjustments. The chain carrier is then set in motion so that its upper flight moves from left to right (Figure 1). As the gripper pairs swing around into the region of the curved ends of the rails 14 they gradually move in to successively grip the cable under the desired pressure. As is clearly seen from Figure 1, when the gripping devices are free of the rails 14 they separate a maximum amount so that they may pass by the cable in their travel in curved paths through sprockets 7.

As is clear from Figure 4, the cable is gripped by the resilient facings 10' at four spaced points for each shoe pair. The number of shoe pairs acting being large. The necessary pressure to pull the cable lengthwise against any resistance encountered will be evenly distributed over a large number of points so that a damaging pressure is not applied to the cable at any one point.

Another important feature of the invention is present in the fact that the gripping faces lie at such angles that a large number of cable sizes may readily be accommodated. In addition the position of the side rails 14 can be adjusted to exert the desired pressure for the different cable sizes.

The manner of adjusting the lower side rail 14 in Figure 1 is quite readily apparent. As shaft 21 is rotated the nuts 18 are caused to rotate and thereby shift the shafts 17 endwise carrying the associated rail 14 with them. The other side rail 14 is adjusted by rotating crank 40 which supplies power to the gear nut 37 to cause shaft 27 to slide longitudinally to the right or to the left. The fundamental action of thus positioning the shaft 27 is to determine the point at which the springs 31 will exert the desired pressure when a cable of a size corresponding to the adjustment is lying in the machine. It is, of course, apparent to those skilled in the art that the real function of this machine is to apply the moving power to a cable during the processing in some other machine to cause the lengthwise movement thereof necessary to overcome any forces encountered during the processing, regardless of the nature of that processing.

In Figure 6 is shown a slight modification of the gripping jaws and it is also shown how a cable of smaller size is accommodated. It will be seen that the four points of contact in the smaller sizes are nearer together than they are in the larger sizes. As illustrated in Figure 6, the gripping jaws are lined with suitably shaped unitary resilient pads 10''. The pads for either type may be secured in the jaws in any suitable and well known manner, as by cement, fusing or the like. It is also noted that Figure 6 shows a different form of side pressure rails 14', but this is an immaterial variation.

It is, of course, apparent that as a cable moves through the machine if it is found for any reason that too much pressure is being exerted on the cable, this pressure can readily be relieved by shifting the shaft 27 to the left, or if the pressure is too light it can be increased by shifting the shaft 27 to the right.

From the above description it will be seen that the endless chains are at the sides of the cable, and hence any oil or grease on them that might drop off will not drip on to the cable as might be the case in machines where at least one of the endless chains is directly above the cable. These chains must be well oiled in use, and would therefore be a possible source of contamination of the cable were they not disposed as in the illustrated structure.

From the above description it will be apparent to those skilled in the art that the principles of this invention may be applied by means of structures of other physical forms, and I do not, therefore, desire to be limited except as required by the appended claims.

What is claimed is:

1. In a cable pulling machine of the type described, the combination including a framework, an endless carrier mounted on said frame for longitudinal movement, a plurality of gripping devices comprising pairs of members slidably mounted on said carrier for movement at right angles to the longitudinal axis of the carrier, means for engaging said gripping devices in pairs for sliding them into and holding them in cable clamping relation, and means for applying power to cause movement of said carrier.

2. In a cable pulling machine of the type described, the combination including a framework, an endless carrier mounted on said frame for longitudinal movement, a plurality of gripping devices movably mounted on said carrier in opposed pairs, resiliently acting means for engaging said gripping devices in pairs to move and hold them in cable gripping position, means for applying power to cause movement of said carrier, and means for independently positioning said holding means to predetermine the gripping pressure of said devices.

3. In a cable pulling machine of the type described, the combination including a framework, an endless carrier mounted on said frame for longitudinal movement, a plurality of gripping devices movably mounted on said carrier in opposed pairs, means for engaging said gripping devices in pairs for moving and holding them in a cable clamping relation, means for applying power to cause movement of said carrier, and means for independently positioning said holding means to adjust their clamping pressure, said last means acting through resilient connections.

4. In a cable pulling machine of the type described, the combination including a supporting framework, a pair of parallel rails mounted on said framework, a plurality of pairs of gripping jaws, and an endless carrier upon which all of said gripping jaws are arranged for moving them between said rails, whereby an elongated member may be gripped at a plurality of points to move it endwise.

5. In a cable pulling machine of the type described, the combination including a supporting framework, a pair of parallel rails mounted on said framework, a plurality of pairs of gripping jaws, an endless carrier upon which all of said gripping jaws are arranged for clamping movement when carried between said rails, whereby an elongated member may be gripped at a plurality of points to move it endwise, means for positioning one of said rails transversely of its length, and means including a resilient connection for positioning the other of said rails transversely of its length.

6. In a cable pulling machine of the type described, the combination including a supporting framework, a pair of parallel rails mounted on said framework, a plurality of pairs of gripping jaws, and an endless carrier upon which all of said gripping jaws are arranged for movement by and transversely of said rails, whereby an elongated member may be gripped at a plurality of points to move it endwise, said rails lying at the sides of the path of said elongated member.

7. In a cable pulling machine of the type described, the combination including a supporting framework, a pair of endless chains supported on said framework for movement along parallel paths, a plurality of cross rods connecting said chains so that they move in unison, a plurality of pairs of gripping jaws slidably mounted on said rods, springs interposed between the members of each pair of gripping jaws to hold them apart, and means positioned to engage said gripping jaws in pairs and force them towards each other.

8. In a cable pulling machine of the type described, the combination including a supporting framework, a pair of endless chains supported on said framework for movement along parallel paths, a plurality of cross rods connecting said chains so that they move in unison, a plurality of pairs of gripping jaws slidably mounted on said rods, springs interposed between the members of each pair of gripping jaws to hold them apart, and means positioned to engage said gripping jaws in pairs and force them towards each other, said means comprising a pair of rails positioned at the sides of the path of travel of said gripping jaws.

9. In a cable pulling machine of the type described, the combination including a supporting framework, a pair of endless chains supported on said framework for movement along parallel paths, a plurality of cross rods connecting said chains so that they move in unison, a plurality of pairs of gripping jaws slidably mounted on said rods, springs interposed between the members of each pair of gripping jaws to hold them apart, and means positioned to engage said gripping jaws in pairs and force them towards each other, said means comprising a pair of rails positioned at the sides of the path of travel of said gripping jaws, said gripping jaws having rollers to ride on said rails.

10. In a cable pulling machine of the type described, the combination including a supporting framework, a pair of endless chains supported on said framework for movement along parallel paths, a plurality of cross rods connecting said chains so that they move in unison, a plurality of pairs of gripping jaws slidably mounted on siad rods, springs interposed between the members of each pair of gripping jaws to hold them apart, means positioned to engage said gripping jaws in pairs and force them towards each other, and means for positioning said rails with respect to the longitudinal axis of the chain to vary the spacing between said chains.

11. In a cable pulling machine of the type described, the combination including a supporting framework, a pair of endless chains supported on said framework for movement along parallel paths, a plurality of cross rods connecting said chains so that they move in unison, a plurality of pairs of gripping jaws slidably mounted on said rods, springs interposed between the members of each pair of gripping jaws to hold them apart, means positioned to engage said gripping jaws in pairs and force them towards each other, said means comprising a pair of rails positioned at the sides of the path of travel of said gripping jaws, and means for positioning said rails with respect to the longitudinal axis of the chain to vary the spacing between said chains.

12. In a cable pulling machine of the type described, the combination including a supporting framework, a pair of endless chains supported on said framework for movement along parallel paths, a plurality of cross rods connecting said chains so that they move in unison, a plurality of pairs of gripping jaws slidably mounted on said rods, springs interposed between the members of each pair of gripping jaws to hold them apart, means positioned to engage said gripping jaws in pairs and force them towards each other, said means comprising a pair of rails positioned at the sides of the path of travel of said gripping jaws, said gripping jaws having rollers to ride on said rails, and means for positioning said rails with respect to the longitudinal axis of the chain to vary the spacing between said chains.

13. In a cable pulling machine of the type described, the combination including a supporting framework, a pair of endless chains supported on said framework for movement along parallel paths, a plurality of cross rods connecting said chains so that they move in unison, a plurality of pairs of gripping jaws slidably mounted on said rods, springs interposed between the members of each pair of gripping jaws to hold them apart, means positioned to engage said gripping jaws in pairs and force them towards each other, and means for positioning said rails with respect to the longitudinal axis of the chain to vary the spacing between said chains, said last means including resilient pressure means.

14. In a cable pulling machine of the type described, the combination including a supporting framework, a pair of endless chains supported on said framework for movement along parallel paths, a plurality of cross rods connecting said chains so that they move in unison, a plurality of pairs of gripping jaws slidably mounted on said rods, springs interposed between the members of each pair of gripping jaws to hold them apart, means positioned to engage said gripping jaws in pairs and force them towards each other, said means comprising a pair of rails positioned at the sides of the path of travel of said gripping jaws, and means for positioning said rails with respect to the longitudinal axis of the chain to vary the spacing between said chains, said last means including resilient pressure means.

15. In a cable pulling machine of the type described, the combination including a supporting framework, a pair of endless chains supported on said framework for movement along parallel paths, a plurality of cross rods connecting said chains so that they move in unison, a plurality of pairs of gripping jaws slidably mounted on said rods, springs interposed between the members of each pair of gripping jaws to hold them apart, means positioned to engage said gripping jaws in pairs and force them towards each other, said means comprising a pair of rails positioned at the sides of the path of travel of said gripping jaws, said gripping jaws having rollers to ride on said rails, and means for positioning said rails with respect to the longitudinal axis of the chain to vary the spacing between said chains, said last means including resilient pressure means.

CARL O. BRUESTLE.